Patented June 8, 1954

2,680,761

UNITED STATES PATENT OFFICE 2,680,761

PROCESS FOR MANUFACTURING DICYANOBUTENE

Ronald H. Halliwell, Victoria, Tex., assignor to E. I. du Pont de Nemours and Company, Wilmington, Del., a corporation of Delaware No Drawing. Application Aug. 12, 1952, Serial No. 304,003

5 Claims. (Cl. 260—465.8)

This invention relates to an improved process for manufacturing dicyanobutene by reaction between dichlorobutene and hydrogen cyanide.

Recently, highly efficient methods have been disclosed for the preparation of 1,4-dicyano-2-butene by cyanation of dichlorobutenes in the presence of copper-containing catalysts in aqueous acidic media (Webb and Tabet U. S. P. 2,477,672; cf. also Whitman 2,477,674, Johnson and Whitman 2,477,617, Calkins 2,557,258). The manufacture of nylon intermediates is now carried out on a very large scale by the use of the aforesaid method. During many months of operation of this process, including recycling the catalyst in the aqueous phase, difficulties were encountered which were characterized by: (1) polymer formation in the reactors, (2) polymer formation in the recycled catalyst solution, (3) loss of activity of catalyst and (4) build up of iron in the recycle streams. While despite these difficulties the process has been highly efficient, it has been desirable to eliminate the said difficulties and thereby provide still further improvements in the said process.

The difficulties hereinabove disclosed have been shown to be associated with the presence of small amounts of iron which accumulate in the aqueous phase. The problem which has arisen therefore was to provide a method for removing such iron from the cyanation recycle catalyst stream. This iron, it has been found, is present in the stream in the form of ferrocyanide ion.

In copending application S. N. 287,603, filed May 13, 1952, it is disclosed that the aforesaid difficulties can be eliminated by interposing in the cyanation process a step for removal of ferrocyanide iron from the catalyst recycle stream. The said copending application describes a process for removal of ferrocyanide iron from a liquid aqueous copper-containing phase contaminated with ferrous iron, produced in the manufacture of 1,4-dicyano-2-butene by reaction between dichlorobutene and hydrogen cyanide in a liquid aqueous acidic medium containing a dissolved cuprous compound as catalyst, which comprises subjecting the constituents of the said aqueous phase to the action of a cation of the class consisting of $Cu^{++}$, $Cd^{++}$, $Mn^{++}$, and $Fe^{+++}$, maintaining the temperature of the resulting mixture at 0° to 100° C., preferably 25° to 60° C. and at a pH in the range of 4.0 to 6.5 whereby a precipitate containing ferrocyanide iron is produced and thereafter separating the said precipitate from the resulting mixture. The cations which are employed in the process of the said application S. N. 287,603 can be produced by introducing an appropriate salt yielding the desired cations, suitable salts being ferric chloride, cupric chloride, cadmium chloride, manganese chloride ($MnCl_2$) and other such water-soluble salts producing such cations.

The present invention can be better understood by reference to the following observations. The difficulties sought to be overcome by the process of the present invention and also the invention described in copending application S. N. 287,603 were not readily apparent from laboratory scale operations, in which no effort was made to exclude oxygen and which were continued for relatively short periods of time so that the build up of ferrocyanide iron in the system was not appreciable. However, when the process was carried out on the plant scale under such conditions that air was excluded for long periods of time, the difficulties hereinabove described became fairly serious. It was discovered, however, that when air was injected into the aqueous portion of the cyanation mixture, products relatively free from polymer were obtained. It was also discovered that when small amounts of ferric chloride were introduced the difficulties also disappeared. However, it was further discovered that the treatment with air did not oxidize the ferrocyanide iron to ferric iron. Experiments with other cations, added to the aqueous catalyst phase led to the discovery that a class of cations hereinabove described capable of producing insoluble ferrocyanides produced the desired improvement. This indicated that the deleterious component of the reaction mixture was the ferrocyanide ion; moreover, this was evidently fully substantiated when it was discovered that the ferrocyanide ion was capable of forming an unstable complex with dicyanobutene and was indeed capable of producing the undesirable effects which had been observed in prolonged operation of the process in the absence of air. The chief source of the ferrocyanide was found to be the sodium cyanide which was used to produce hydrogen cyanide in situ; it was discovered that the purest available sodium cyanide contained from 20 to 200 parts per million of ferrocyanide.

While the method described in copending application S. N. 287,603 constituted an important improvement in the process for manufacturing 1,4-dicyano-2-butene, it has now become apparent, as hereinafter disclosed in detail, that still further improvements in this process have also been attainable. In the process of S. N. 287,603, the added ferric ion caused precipitation of Prussian blue which is rather costly to remove the preferred method being through the use of a centrifuge. The addition of cadmium ion instead of ferric ion caused precipitation of ferrous iron without simultaneous precipitation of copper which was advantageous, but of course cadmium is itself relatively expensive. Manganese ions acted like cadmium ions in that they precipitated the ferrous iron selectively, but the precipitate obtained when manganese was used was relatively costly to separate.

In accordance with the foregoing, an object of the present invention is to provide still further improvements in the process for manufacturing 1,4-dicyano-2-butene, and more particularly improvements in the ferrocyanide removal step by lowering the pH to such a level that substantially all of the ferrous iron is precipitated, admixing at least a part of the resultant slurry with sufficient alkali metal cyanide to dissolve cuprous copper, leaving part of the ferrous iron undissolved, and thereafter separating liquid phase from the remaining slurry. More particularly, it has been discovered in accord with this invention that the removal of ferrocyanide iron from a liquid aqueous copper-containing phase contaminated with ferrocyanide iron, produced in the manufacture of 1,4-dicyano-2-butene by reaction between dichlorobutene and hydrogen cyanide in a liquid aqueous acidic medium containing a dissolved cuprous compound as catalyst at a pH of 4 to 6.5, can be achieved, and the polymer formation hereinabove described can be suppressed, by a process which comprises lowering the pH of the said aqueous phase to a value between 1.0 and 2.5, preferably 1.7, whereby a slurry of copper-containing compound is produced, said slurry containing substantially all of the ferrocyanide iron in the reaction system, concentrating the said slurry by removal of liquid component therefrom, admixing the resultant concentrated slurry with only enough aqueous sodium cyanide to produce a pH of 4.0 to 4.5, whereby cuprous copper goes into solution and a part of the ferrocyanide iron remains undissolved, separating the liquid phase from the remaining slurry and recycling the said separated liquid, constituting an aqueous copper-containing solution, to a reaction vessel wherein an aqueous acidic catalyst-containing phase is employed in the reaction between hydrogen cyanide and dichlorobutene to produce 1,4-dicyano-2-butene. The pH employed in treating the slurry must be narrowly controlled, for below the critical range the copper does not appreciably dissolve and above the critical range the iron does not remain partially undissolved.

The invention is based upon the discovery that lowering the pH of the aqueous phase as hereinabove described to about 1.7 causes precipitation of copper and iron, evidently in the form of a mixture of cuprous cyanide and a copper-containing ferrocyanide (no $Cu^{++}$, $Cd^{++}$, $Mn^{++}$, or $Fe^{+++}$ being added as in the method of copending application S. N. 287,603).

If desired, the method of this invention can be employed in combination with the method of S. N. 287,603; for example, very outstanding results are obtained by performing the process as described in the example given below, and thereafter introducing $Mn^{++}$ (or $Cd^{++}$, $Cu^{++}$, $Fe^{+++}$) into the concentrated product thus obtained, for a final purging of ferrocyanide ions. Alternatively, $Mn^{++}$ can be introduced into the mixture prior to removal of solid phase at a pH of 4.0 to 4.5. The latter embodiment has certain important advantages which make it very valuable and useful in commercial operation. It permits better clean-up of ferrous iron, and facilitates operation of the thickeners which are employed in large scale operation for separation of the solid phase. Moreover, such addition of $Mn^{++}$ also permits operation at a wider range of temperature. This is due to the fact that in operation without addition of $Mn^{++}$ or other cation, after precipitation of the copper cyanide and copper ferrocyanide a virtually unavoidable oxidation is encountered. This is believed to be due to the conversion of part of the cuprous ferrocyanide to cupric ferrocyanide. Since in the subsequent resolution of the slurry in sodium cyanide, cupric ferrocyanide is much more readily separated from cuprous cyanide than is cuprous ferrocyanide, the efficiency of iron removal is very dependent on this fortuitous oxidation within the system. Since in turn this degree of oxidation is very dependent on temperature, being very slow below 50° C., efficiency of iron removal in the absence of $Mn^{++}$ or other added cation is much less efficient below 50° C. and is in effect optimum between 50° C. and 80° C. In the presence of added $Mn^{++}$, since this fortuitous oxidation is not required, the removal of iron is highly efficient at any temperature at which liquid water can exist, e. g. a temperature within the range 0 to 100° C. at ordinary or moderately elevated pressure.

The invention is illustrated further by means of the following examples.

*Example I*

An aqueous raffinate (i. e. a benzene-extracted, copper-containing brine) produced by benzene-extraction of the products obtained by reaction between dichlorobutene and hydrogen cyanide (produced in situ by adding NaCN) in the presence of aqueous acid (pH=5) and cuprous copper (0.5% by weight, introduced as cyanide) was found to contain a trace of ferrocyanide. The pH of the raffinate was lowered to 1.7, which caused precipitation of cuprous cyanide. This was removed by thickening and filtration, yielding a brine containing 700 p. p. m. of cuprous copper and a slurry having a precipitated solids content of 10% (hydrogen cyanide content of 0.1%), the HCN was recovered by distillation, and for disposal purposes the brine was discharged to a well containing scrap iron to remove copper before final disposal of the brine. NaCN was added to the slurry until the pH reached 4.5. This caused cuprous copper to go into solution, while leaving ferrous iron in the precipitate, which was removed by settling. The recovered liquid products containing dissolved copper could be used effectively in carrying out the cyanation of dichlorobutene as above described. To demonstrate the critical nature of the quantity of NaCN added to the slurry the experiment was repeated except that the quantity of NaCN added was slightly greater, i. e. enough to produce a pH of 10. The iron in the solid phase did not remain undissolved, but passed entirely into the liquid phase, giving a solution which precipitated black solids on standing.

*Example II*

Example I was repeated and a CuCN slurry containing 4.9% Cu and 560 p. p. m. Fe was produced. This was partially dissolved by addition of enough NaCN to produce a pH of 4.5, as in Example I. The resulting mixture had a total iron content of 311 p. p. m. and a copper content of 3.36%. Following the procedure without addition of $Mn^{++}$ or other cation as in Example I, one portion of this mixture was filtered, and the filtrate had an iron content of 240 p. p. m. To another portion at 60° C. was added 0.13% of manganese, which was introduced as a 10% solution of $MnCl_2$ in water. After filtration the liquid thus obtained contained 76 p. p. m. of iron. To still another portion at 30° C. was added 0.13% manganese, which was introduced as a 10% solution of $MnCl_2$ in water. After filtration the liquid thus obtained contained only 43 p. p. m of iron.

The phenomena described in Example I can be accounted for by means of the following theory. The copper is present in the raffinate in the form of $Cu(CN)_2^-$. Upon addition of enough $H^+$ to lower the pH to 1.7 the products formed are HCN and solid $Cu(CN)$. Solution of $Cu(CN)$ in NaCN at a pH of 4.5 yields $Cu(CN)_2^-$ and/or $Cu(CN)_3^{--}$, the iron remaining behind as an insoluble ferrocyanide containing copper. Adding NaCN until the pH is 10 converts the cuprous copper of the ferrocyanide to a different ion probably $Cu(CN)_4^{---}$, while also producing a soluble ferrocyanide. It will be understood, however, that the invention is in no way dependent upon the correctness or incorrectness of any such theory.

The invention is of outstanding utility in the process of manufacturing nylon intermediates by cyanation of dichlorobutene.

I claim:

1. A process for removing ferrocyanide iron from a liquid aqueous copper-containing phase contaminated with ferrocyanide iron produced in the manufacture of 1,4-dicyano-2-butene by reaction between dichlorobutene and hydrogen cyanide in a liquid aqueous acidic medium containing a dissolved copper compound as catalyst at a pH of 4 to 6.5 which comprises lowering the pH of the said aqueous phase to a value between 1.5 and 2, whereby a slurry of copper-containing compound is produced, said slurry containing substantially all of the ferrocyanide iron in the reaction system, concentrating the said slurry by removal of liquid component therefrom, admixing the resultant concentrated slurry with only enough aqueous sodium cyanide to produce a pH of 4.0 to 4.5, whereby cuprous copper goes into solution and part of the ferrocyanide iron remains undissolved, separating the liquid phase from the remaining slurry and recycling the said separated liquid, constituting an aqueous copper-containing solution, to a reaction vessel wherein an aqueous acidic catalyst-containing phase is employed in the reaction between hydrogen cyanide and dichlorobutene to produce 1,4-dicyano-2-butene.

2. Process of claim 1 in which the slurry is precipitated at a pH of 1.7.

3. Process of claim 1 wherein $Mn^{++}$ is introduced into the mixture prior to the said separation of the liquid phase from the slurry, and the said separation is carried out at a temperature of 20° to 40° C.

4. Process of claim 1 wherein no added cation is introduced into the mixture prior to the said separation of the liquid phase from the slurry, and the temperature of the liquid is maintained at 50° to 80° C. throughout the entire process.

5. A process for removing ferrocyanide iron from a liquid aqueous cuprous copper-containing phase contaminated with ferrous iron produced in the manufacture of 1,4-dicyano-2-butene by reaction of dichlorobutene with hydrogen cyanide in a liquid aqueous acidic medium containing a dissolved copper compound as catalyst which comprises lowering the pH of the said aqueous phase to such a level within the range of 1.0 to 2.5 that substantially all of the ferrous iron is precipitated as a slurry containing both ferrocyanide and cuprous copper, admixing at least a part of the resultant slurry with sufficient alkali metal cyanide to dissolve cuprous copper leaving part of the ferrous iron undissolved, and thereafter separating liquid phase from the remaining slurry.

No references cited.